(12) United States Patent
Liu et al.

(10) Patent No.: US 7,182,517 B2
(45) Date of Patent: Feb. 27, 2007

(54) ANTI-VIBRATION DEVICE FOR A MOTOR BEARING

(75) Inventors: Wen-Hao Liu, Taipei (TW); Hung-Erh Tai, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 82 days.

(21) Appl. No.: 10/948,184

(22) Filed: Sep. 24, 2004

(65) Prior Publication Data
US 2006/0067596 A1 Mar. 30, 2006

(51) Int. Cl.
*F16C 17/04* (2006.01)
(52) U.S. Cl. .................... 384/125; 384/425
(58) Field of Classification Search ......... 384/125, 384/223, 425, 426
See application file for complete search history.

(56) References Cited

U.S. PATENT DOCUMENTS 3,749,457 A * 7/1973 Latussek et al. ............ 384/223
4,452,541 A * 6/1984 Carpenter ................... 384/223

* cited by examiner

*Primary Examiner*—Lenard A. Footland

(57) ABSTRACT

An anti-vibration device for a motor bearing at least comprises an axial barrel core, a shaft and a shock retard piece. The axial barrel core has a recess at the bottom thereof with the recess having a flat top. A bearing is received in the axial barrel and the shock retard piece is placed on the top of the recess so that a space is formed between the shock retard piece and the recess available for the shock retard piece being deformed. The shaft is movably attached to the barrel core to contact with shock retard piece. When the shaft rotates, vibration can be retarded to allow the shaft providing a steady rotation by way of support of the shock retard piece.

2 Claims, 11 Drawing Sheets

ANTI-VIBRATION DEVICE FOR A MOTOR BEARING

BACKGROUND OF THE INVENTION

1. Field of the Invention

The present invention is related to an anti-vibration device for a motor bearing and particularly to a device capable of preventing the bearing in a motor from vibrating or swaying during rotating.

2. Brief Description of the Related Art

Referring to FIGS. 1 and 2, the conventional support device of a motor shaft at least has a fan frame 11 and at least a support base 12 is provided in the fan frame 11. An axial barrel core 121 is formed on the support base 12 and a bearing 13 is received in the barrel core 121. A shaft 14 passes through the bearing 13 to be movably attached to the support base 12 at an end thereof and connects with a fan wheel 15 at another end thereof with the end passing through the bearing 13 being provided with a neck part 141 for engaging with a retaining ring 16. The retaining ring 16 can interfere with the bearing 13 to prevent the shaft 14 from being loosening and apart from the barrel core 121. The barrel core 121 at the bottom thereof has a wearable pad 17 for being contacted with an end of the shaft 14 to reduce friction force during rotating. However, the clearance in the bearing 13 results in the shaft 14 swaying while the shaft 14 rotates in the bearing 13. Further, there are external interferences during the shaft 14 rotating such as air flow resistance and the load subjected by the shaft 14. In addition, the shaft 14 generating vibration under different rotational speeds can worsen the seriousness of vibration to the shaft 14 and to occur noise.

SUMMARY OF THE INVENTION

A primary object of the present invention is to provide an anti-vibration device for a motor bearing in which the axial barrel core has a recess to allow at least a shock retard piece having a space for being deformed after absorbing exerting force of the shaft such that the shaft can rotates steadily.

Another object of the present invention is to provide an anti-vibration device for a motor bearing in which at least a shock retard piece has a recess to allow at least a shock retard piece having a space for being deformed after absorbing exerting force of the shaft such that the shaft can maintain steady rotational speed.

A further object of the present invention is to provide an anti-vibration device for a motor bearing in which at least a shock retard piece is disposed between the inner bottom of the axial barrel and a wearable element to having a space for being deformed after absorbing exerting force of the shaft such that the shaft can maintain a steady rotational speed.

A further object of the present invention is to provide an anti-vibration device for a motor bearing in which a shock retard piece is mounted in the axial barrel core to maintain a steady rotational speed of the shaft and enhance the life span of a fan.

A further object of the present invention is to provide a control system of transferring pulse width modulation signal for a cooling fan motor with which the transferred analog voltage signals are arranged with the resistance in the transfer unit to set change value of the analog voltage signals for increasing or decreasing control range of the pulse width modulation.

A further object of the present invention is to provide a control system of transferring pulse width modulation signal for a cooling fan motor with which the pulse width modulation signal can be transformed as analog voltage signals to reduce frequency change of the pulse width modulation signal so as to overcome deficiencies of rotational speed deviation of the fan motor and electrical noise generated from low frequency.

Accordingly, an anti-vibration device for a motor bearing of the present invention at least comprises an axial barrel core, a shaft and a shock retard piece. The axial barrel core has a recess at the bottom thereof with the recess having a flat top. A bearing is received in the axial barrel and the shock retard piece is placed on the top of the recess so that a space is formed between the shock retard piece and the recess available for the shock retard piece being deformed. The shaft is movably attached to the barrel core to contact with shock retard piece. When the shaft rotates, vibration can be retarded to allow the shaft providing a steady rotation by way of support of the shock retard piece.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
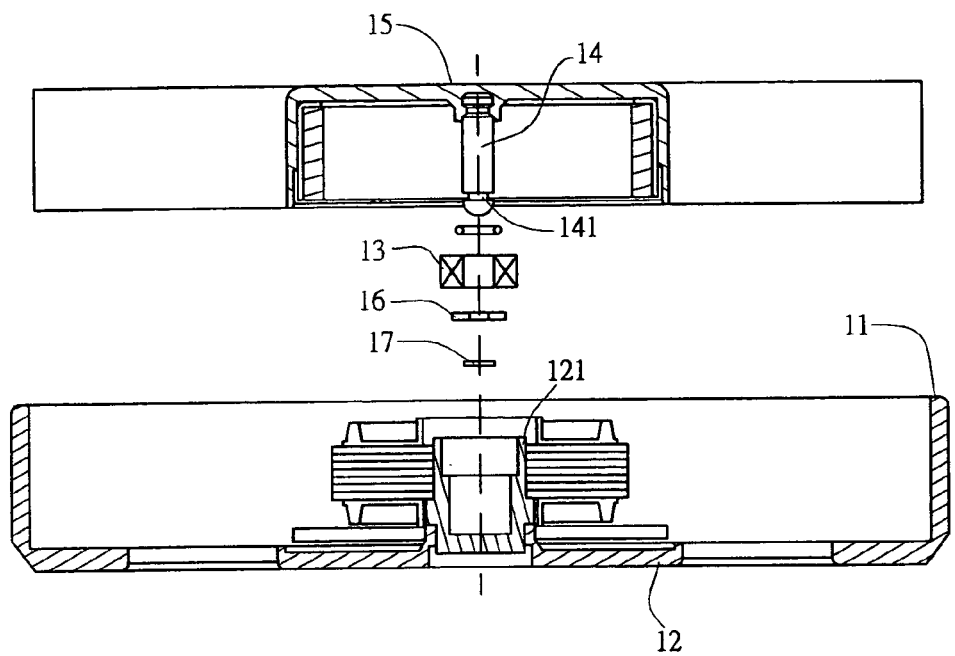
FIG. 1 is an exploded perspective view of a conventional motor bearing.
Figure 2:
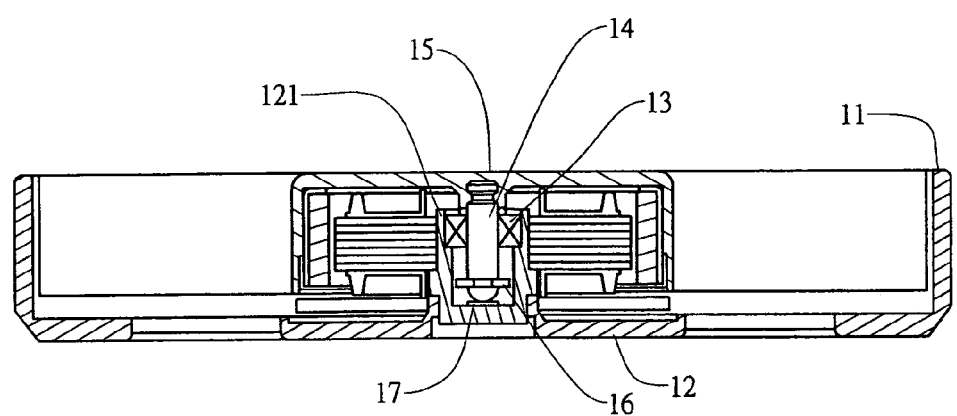
FIG. 2 is a perspective view of a conventional motor bearing.
Figure 3:
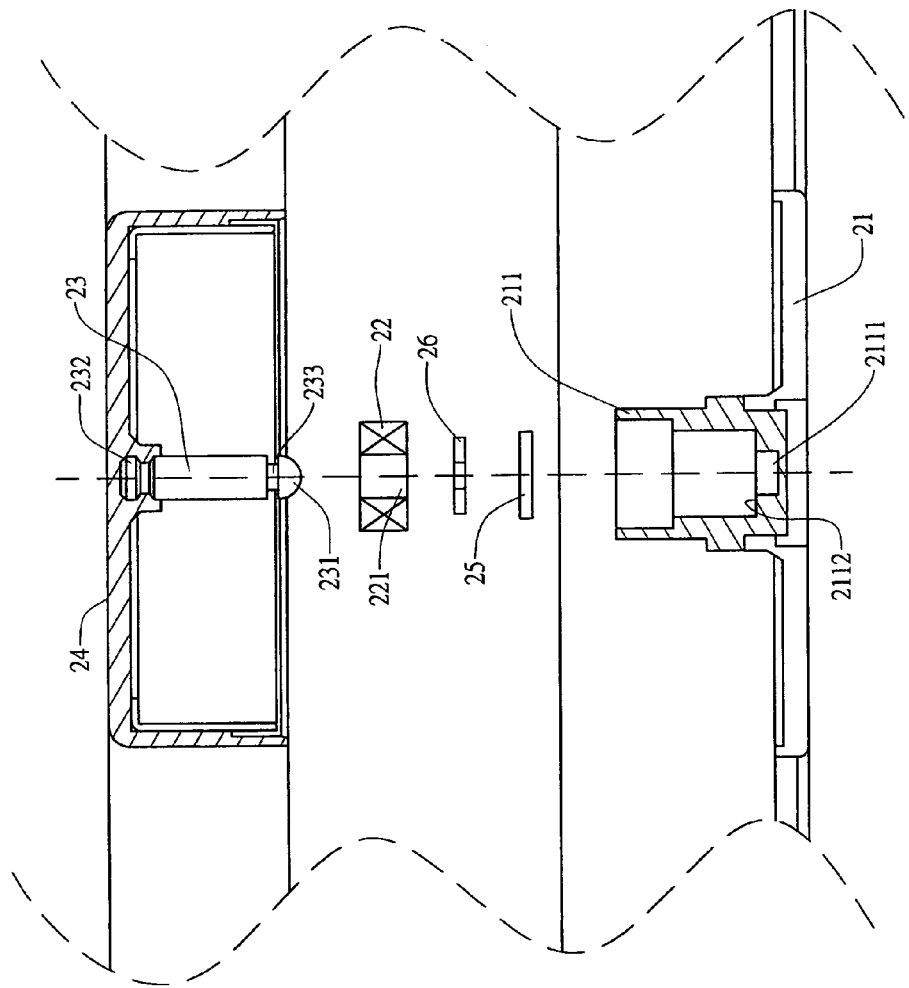
FIG. 3 is an exploded sectional view of the first embodiment according to the present invention.
Figure 4:
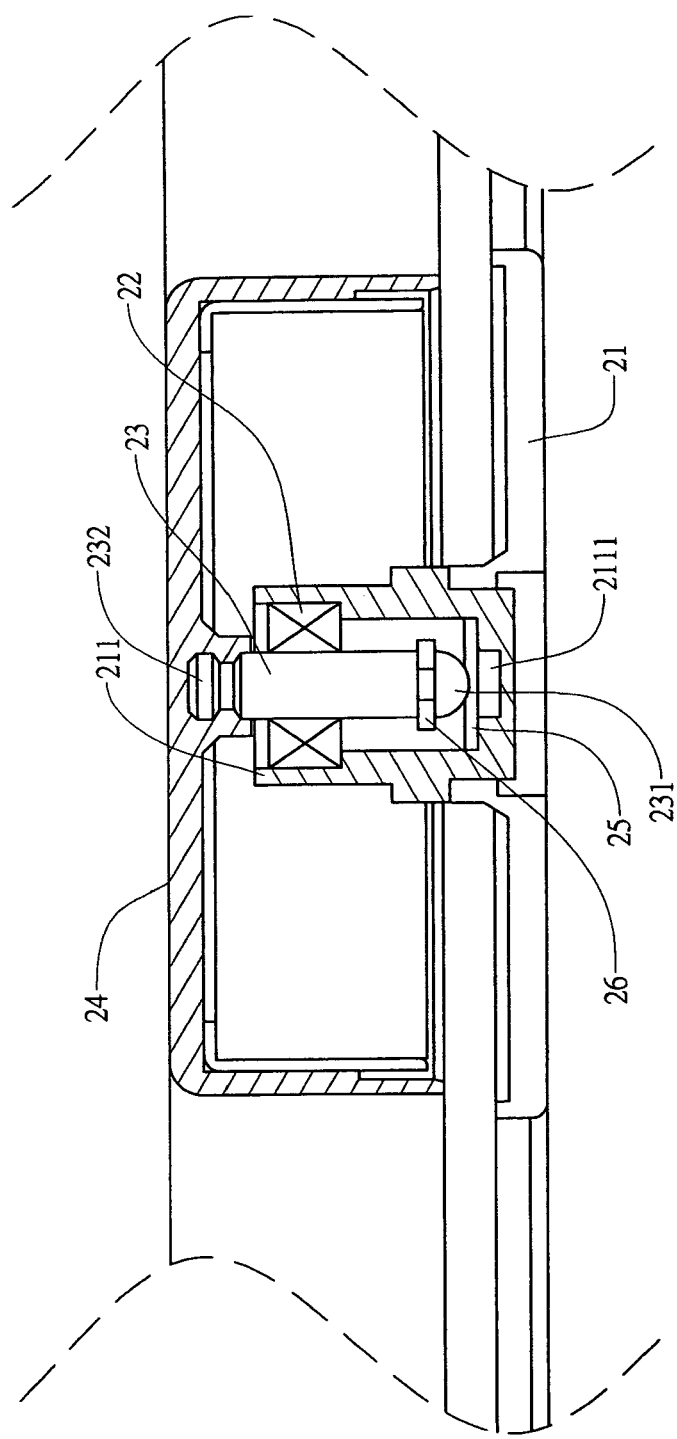
FIG. 4 is an assembled sectional view of the first embodiment according to the present invention.

Referring to FIGS. 3 and 4, an anti-vibration device for a motor bearing according to the present invention in the first preferred embodiment thereof includes a support base 21, a shock retard piece 25, a bearing 22 and a shaft 23. The support base 21 has an axial barrel 211 with an annular recess 2111 at the bottom of the axial barrel 211 and an annular flat part 2112 surrounding the recess 2111. The shock retard piece 25 is placed on the flat part 2112 and thebearing 22 is received in the barrel 211. The shaft 23 is joined to a fan wheel 24 at the outer end 232 thereof and provides a neck part 233 at the inner end 23 1 thereof to pass through a central hole 221 of the bearing 22. A retaining ring 26 engages with the neck part 233 such that the shaft 23 can be movabiy disposed in the barrel 211 without loosening apart from the barrel 211. Further, the inner end 231 of the shaft 23 contacts with the shock retard piece 25, i.e., the shock retard piece 25 is disposed between the inner end 231 of the shaft 23 and the recess 2111.

Figure 5:
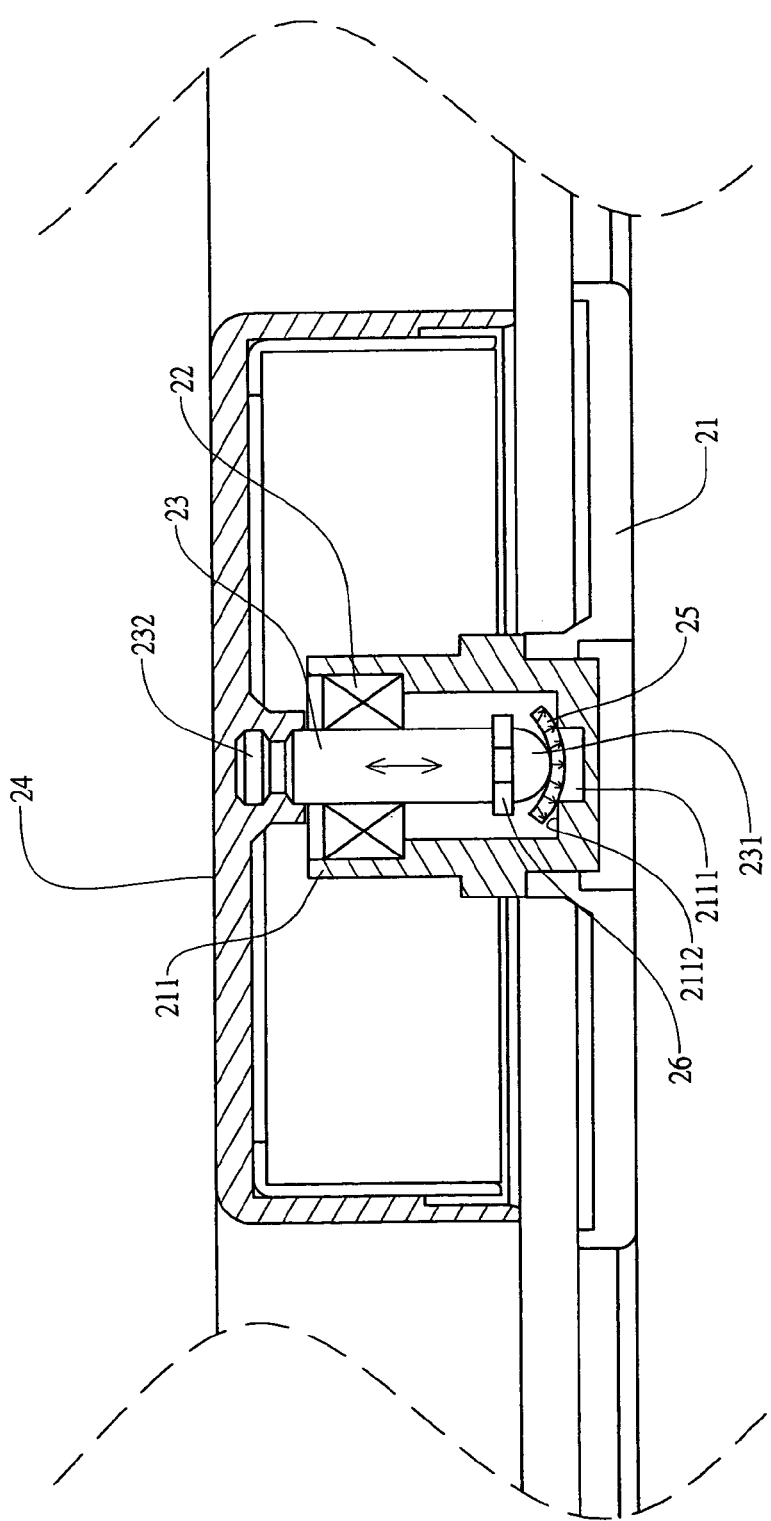
FIG. 5 is a sectional view illustrating the first embodiment in operation.

Referring to FIG. 5, when the shaft 23 rotates with the fan wheel 24 to move fluid, a clearance between the bearing 22 and the shaft 23 results in the shaft 23 swaying during rotating. In addition, due to the upper end 232 of the shaft 23 being attached to the fan wheel 24 to undertake the weight of the fan wheel 24, to interference of the fluid to the fan wheel 24 and of the rotational speed of the fan wheel 24 cause the shaft 23 to occur vibration and swaying. But, the vibration and the swaying become upward and downward movement do to the shaft is restricted to move laterally with the bearing 22. Then, the upward and downward movement is transmitted to the shock retard piece 25 to be absorbed by the shock retard piece 25. Under this circumstance, the shock retard piece 25 is deformed elastically to damp the external force exerting to the shaft 23. Further, the recess 2111 at the bottom of the barrel 211 provides a room for accommodating elastic deformation of the shock retard piece 25 so as to decrease action of the external force. Hence, the shaft 23 can rotate steadily and prolong the life span thereof.

Figure 6:
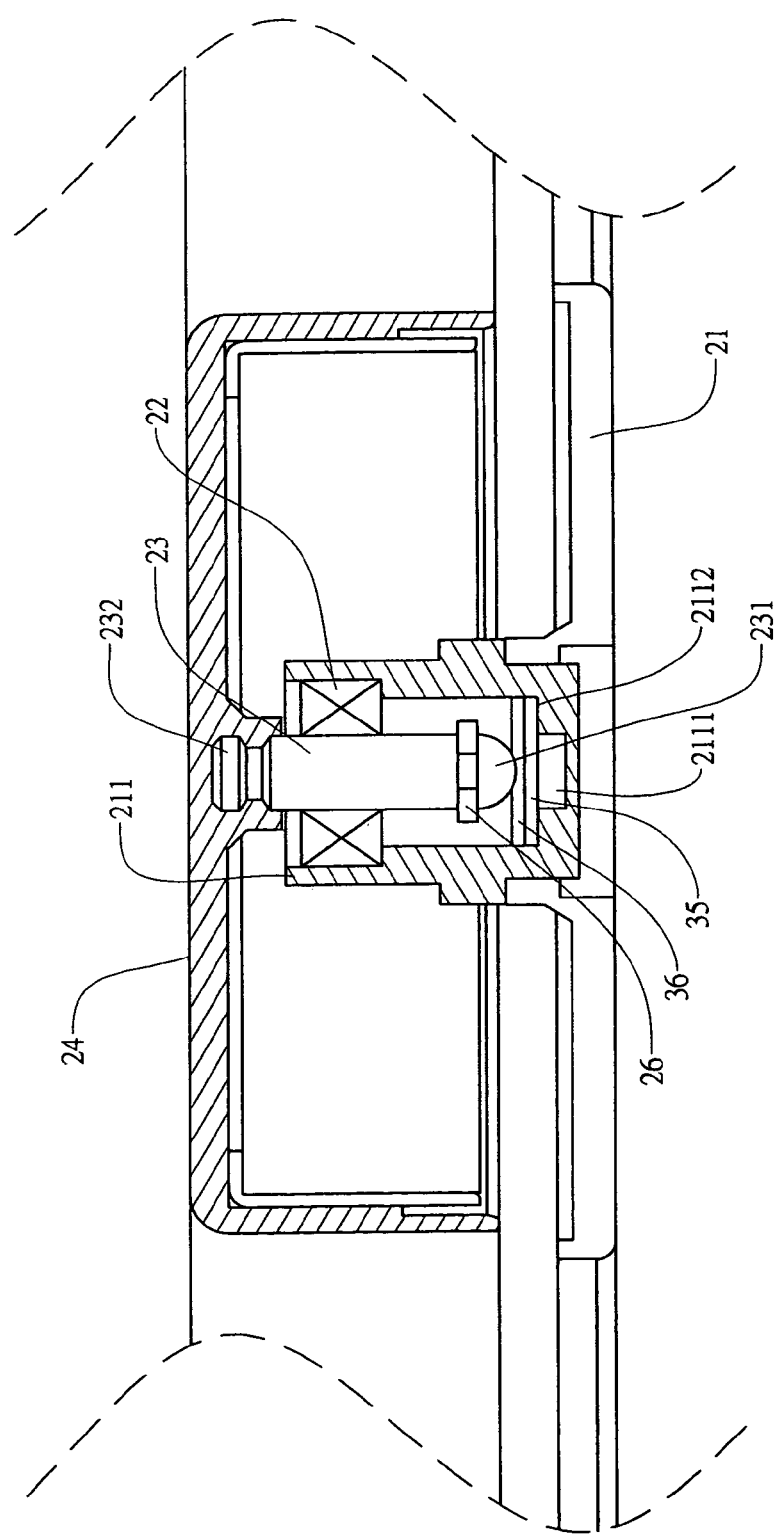
FIG. 6 is an assembled sectional view of the second embodiment according to the present invention.

Referring to FIG. 6, the second preferred embodiment of the present invention is illustrated. The entire structure and function is similar to the first preferred embodiment. Identical parts with the same designated numerals are not explained further. The difference of the second preferred embodiment is that a shock retard piece 35 is only provided with a feature of resilience and at least an wearable element 36 is disposed on top of the shock retard piece 35 to contact with the inner end 231 of the shaft 23 for decreasing friction force during rotating. The shock retard piece 35 can reduce vibration and swaying of the shaft 23 such that the shaft 23 can rotate steadily and prolong the life span thereof.

Furthermore, the shock retard element 35 and the wearable element 36 can be made integrally or separately. The shock retard piece 25 absorbs the upward and downward movement and is deformed elastically to damp the external force exerting the shaft 23. Further, the recess 2111 at the bottom of the barrel core 211 provides a room for accommodating elastic deformation of the shock retard piece 25 so as to decrease the action of the external force during elastically deforming. Hence, the shaft 23 can rotate steadily and prolong the life span thereof.

Figure 7:
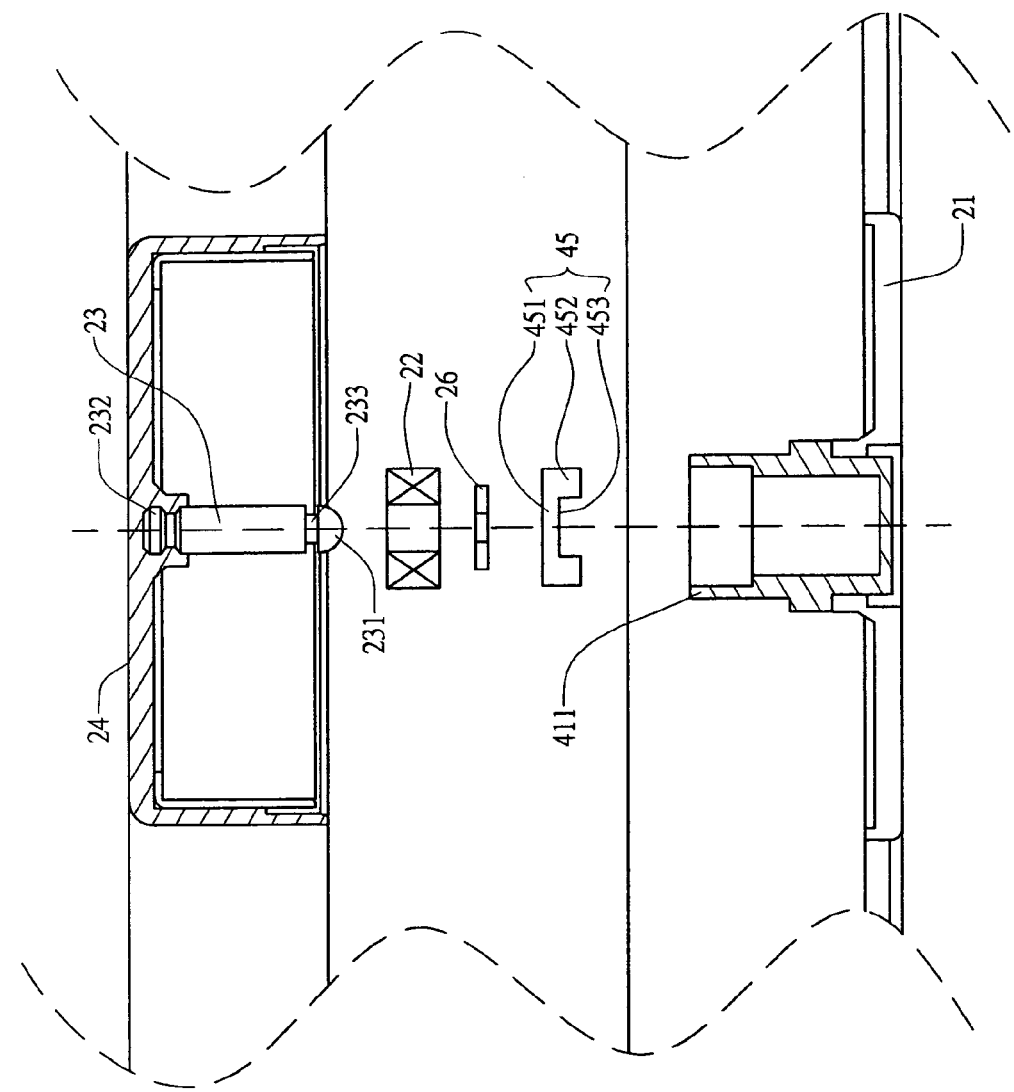
FIG. 7 is an exploded sectional view of the third embodiment according to the present invention.
Figure 8:
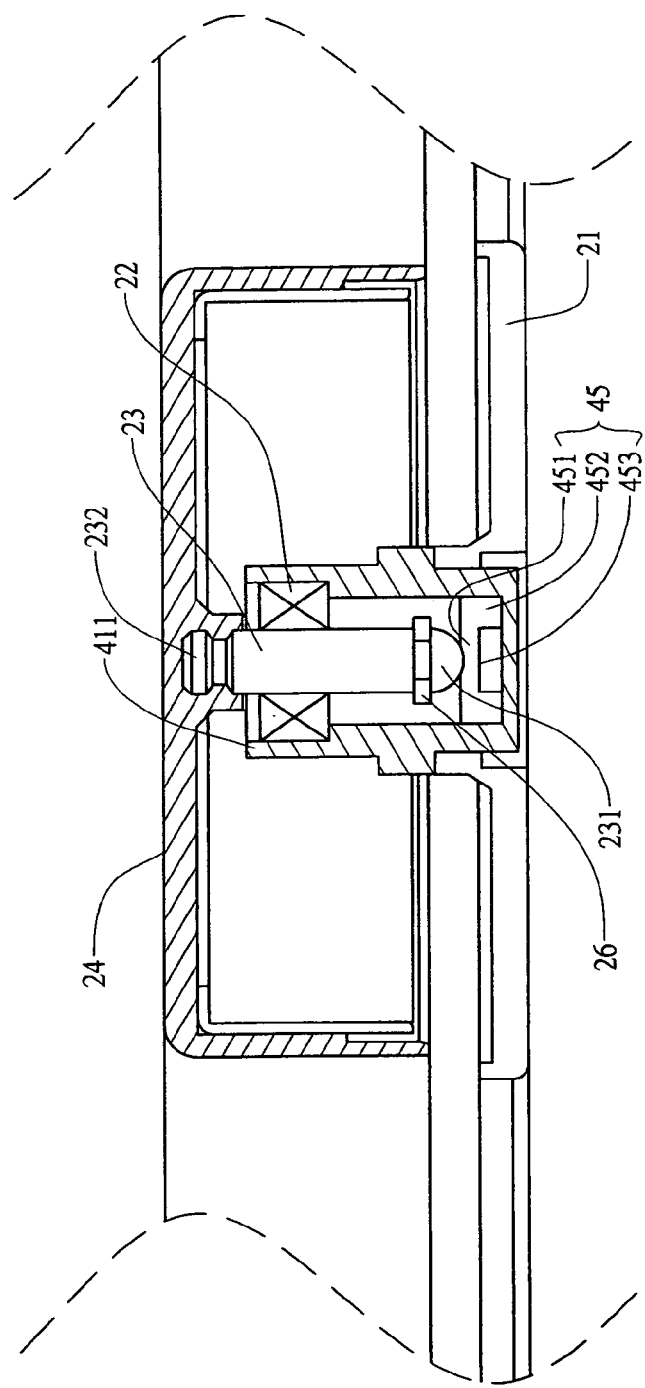
FIG. 8 is an assembled sectional view of the third embodiment according to the present invention.

Referring to FIGS. 7 and 8, the third preferred embodiment of the present invention is illustrated. The entire structure and function is similar to the first preferred embodiment. Identical parts with the same designated numerals are not explained further. The difference of the third preferred embodiment from the preceding embodiments is in that the axial barrel core 411 has a flat bottom and the shock retard piece 45 has a top wall 451 and a lateral wall 452 connecting with the top wall 452 and a recess 453 is formed between the top wall and the lateral wall 452. The top wall 451 contacts with the inner end 231 of the shaft 23 and the lateral wall 452 at the lower end thereof contacts with the inner bottom of the barrel core 411. The shock retard piece 45 is disposed between the shaft 23 and the inner bottom of the barrel core 411. Further, the shock retard piece 45 is wearable to reduce friction force being created during rotating.

When vibration and swaying resulting from the shaft 23 rotating become moving upward and downward, the shock retard piece 45 absorbs the upward and downward movement and is deformed elastically to damp the external force exerting the shaft 23. That is, the top wall 451 of the shock retard piece 45 generates elastic deformation Further, the recess 2111 at the bottom of the barrel core 211 provides a room for accommodating elastic deformation of the shock retard piece 25 so as to decrease the action of the external force during elastically deforming. Hence, the shaft 23 can rotate steadily and prolong the life span thereof.

Figure 9:
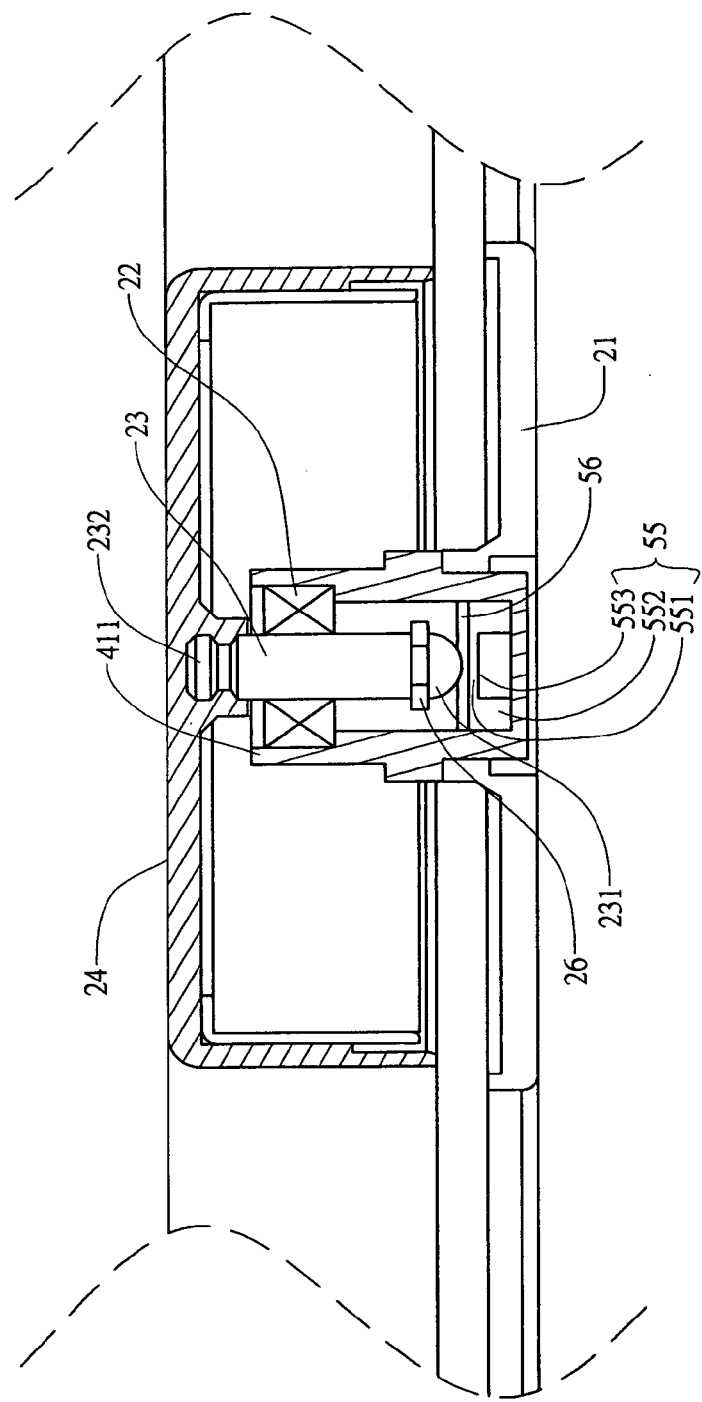
FIG. 9 is an assembled sectional view of the fourth embodiment according to the present invention.

Referring to FIG. 9, the fourth preferred embodiment of the present invention is illustrated. It in noted that the entire structure and function is similar to the first preferred embodiment. Identical parts with the same designated numerals are not explained further. The difference of the fourth preferred embodiment from the preceding embodiments is in that a shock retard piece 35 is only provided with a feature of resilience. The shock retard piece 55 has a top wall 551 and a lateral wall 552 connecting with the top wall 452 so as to form a recess 553 between the top wall and the lateral wall 452. The shock retard piece 55 is disposed between the shaft 23 and the inner bottom of the barrel core 411. Further, the shock retard piece 45 is wearable to reduce friction force being created during rotating and at least a wearable element 56 is disposed on top of the shock retard piece 55 to contact with the inner end 231 of the shaft 23 for decreasing friction force during rotating. The shock retard piece 55 can reduce vibration and swaying of the shaft 23 such that steady rotation of the shaft 23 can be maintained so as to prolong the life span thereof.

Furthermore, the shock retard element 55 and the wearable element 36 can be made integrally or separately.

Figure 10:
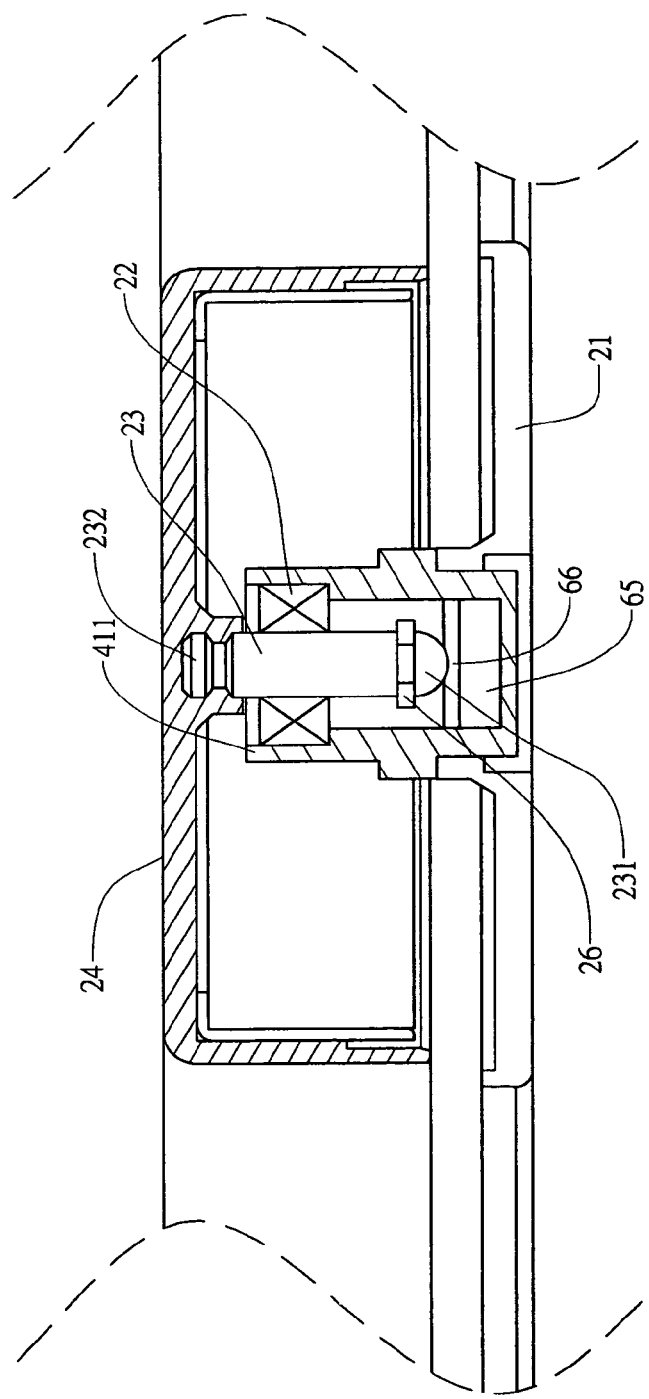
FIG. 10 is an assembled sectional view of the fifth embodiment according to the present invention.

Referring to FIG. 10, the fourth preferred embodiment of the present invention is illustrated. It in noted that the entire structure and function is similar to the first preferred embodiment. Identical parts with the same designated numerals are not explained further. The difference of the fourth preferred embodiment from the preceding embodiments is in that the axial barrel core 411 has a flat bottom and a shock retard piece 65 is a spring plate. At least a wearable element 66 is disposed on top of the shock retard piece 65 to contact with the inner end 231 of the shaft 23 for decreasing friction force during rotating. The shock retard piece 65 can reduce vibration and swaying of the shaft 23 such that steady rotation of the shaft 23 can be maintained so as to prolong the life span thereof.

Figure 11:
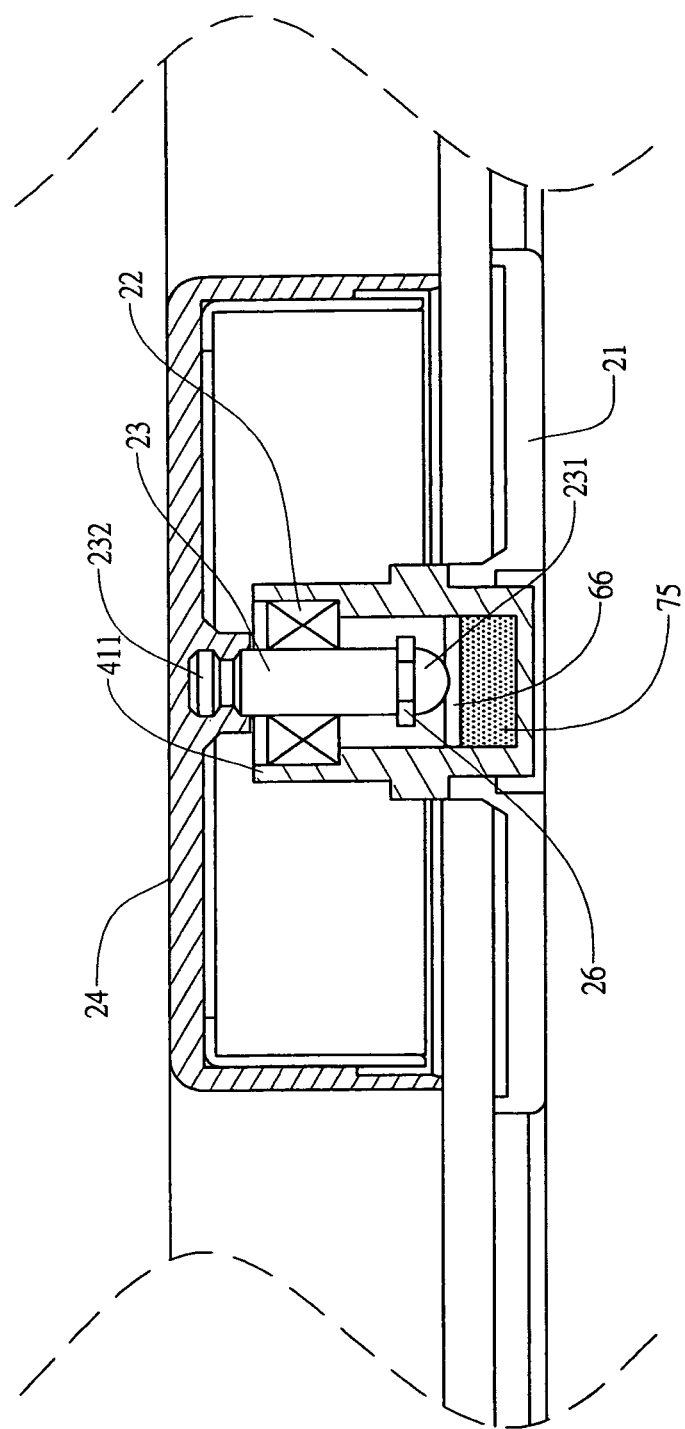
FIG. 11 is an assembled sectional view of the sixth embodiment according to the present invention.

Referring to FIG. 11, the fifth preferred embodiment of the present invention is illustrated. It in noted that the entire structure and function is similar to the first preferred embodiment. Identical parts with the same designated numerals are not explained further. The difference of the fifth preferred embodiment from the preceding embodiments is in that a shock retard piece 75 is made of stuffing material such as foam, emulsion or silicone jelly to elastically support the shaft 23 and reduce vibration and swaying of the shaft 23 can be reduced due to elastic deformation of the shock retard piece 75 during the shaft being in a state of rotating such that steady rotation of the shaft 23 can be reached so as to prolong the life span thereof.

Figure 12:
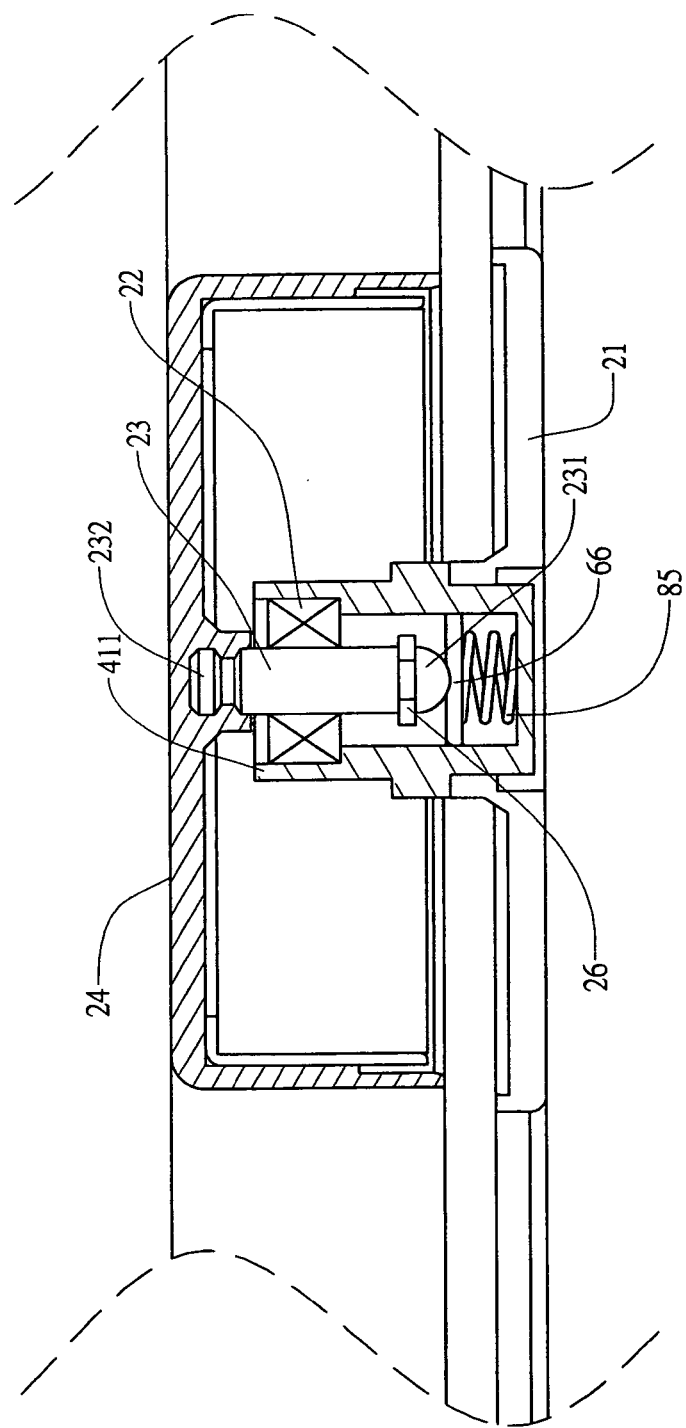
FIG. 12 is an assembled sectional view of the second embodiment according to the present invention.

Referring to FIG. 12, the fifth preferred embodiment of the present invention is illustrated. It in noted that the entire structure and function is similar to the first preferred embodiment. Identical parts with the same designated numerals are not explained further. The difference of the fifth preferred embodiment from the preceding embodiments is in that a shock retard piece 85 is a spring to elastically support the shaft 23 and reduce vibration and swaying of the shaft 23 can be reduced due to elastic deformation of the shock retard piece 85 during the shaft 23 being in a state of rotating such that steady rotation of the shaft 23 can be reached and the life span thereof can be prolonged.

While the invention has been described with referencing to preferred embodiments thereof, it is to be understood that modifications or variations may be easily made without departing from the spirit of this invention, which is defined by the appended claims.

What is claimed is:

1. An anti-vibration device for a motor bearing, comprising:
    an axial barrel, having an upper portion and a bottom;
    a bearing, being disposed in the barrel and located at an upper portion of the barrel; and
    a shaft with a first end and a second end, the first end being round and extending through the bore in the axial barrel core and the second end joined to the center of a fan wheel;
    characterized in that the axial barrel has an annular recess at the bottom thereof corresponding to the first end of the shaft with an annular flat surface surrounding the recess and a wearable circular shock retard piece is placed on the flat surface to contact with the first end of the shaft such that the shock retard niece is capable of absorbing upward and downward movements of the shaft resulting from vibration and is deformed elastically and the recess provides a room to comply with elastic deformation of the shock retard piece while the shock retard piece is subjected to an external force due to the vibration.

2. The anti-vibration device for a motor bearing as defined in claim 1, wherein at least a wearable element on the shock retard piece.

* * * * *